(12) United States Patent
Wehner

(10) Patent No.: US 7,523,838 B2
(45) Date of Patent: Apr. 28, 2009

(54) HOUSING

(75) Inventor: Holger Wehner, Bad Soden (DE)

(73) Assignee: Siemens Aktiengesellschaft, Munich (DE)

( * ) Notice: Subject to any disclaimer, the term of this patent is extended or adjusted under 35 U.S.C. 154(b) by 599 days.

(21) Appl. No.: 10/487,137

(22) PCT Filed: Aug. 28, 2002

(86) PCT No.: PCT/DE02/03176

§ 371 (c)(1),
(2), (4) Date: Feb. 19, 2004

(87) PCT Pub. No.: WO03/024566

PCT Pub. Date: Mar. 27, 2003

(65) Prior Publication Data

US 2004/0211775 A1  Oct. 28, 2004

(30) Foreign Application Priority Data

Aug. 31, 2001 (DE) ................................ 101 42 442

(51) Int. Cl.
*B65D 90/08* (2006.01)
(52) U.S. Cl. ..................................................... 220/4.21
(58) Field of Classification Search .................. None
See application file for complete search history.

(56) References Cited

U.S. PATENT DOCUMENTS 1,533,299 A * 4/1925 Armknecht .................. 220/212
2,226,109 A * 12/1940 Soper ..................... 220/592.19
3,891,224 A * 6/1975 Ditcher ........................ 277/605
4,089,152 A   5/1978 Zanasi
4,372,459 A * 2/1983 Newman ..................... 220/678
5,335,815 A * 8/1994 Josselyn ................. 220/560.03
5,571,412 A   11/1996 Nerli
5,595,321 A * 1/1997 Berglund ..................... 220/565
5,668,922 A * 9/1997 Ross et al. ................... 392/441
5,702,023 A * 12/1997 Ehs ............................. 220/582
5,817,234 A   10/1998 Dye et al.

FOREIGN PATENT DOCUMENTS

| DE |     553 032     | 6/1932 |
|----|-----------------|--------|
| DE | 31 43 093 A1    | 5/1983 |
| DE | 39 27 528 A1    | 2/1991 |
| DE |  0 31 932 A1    | 1/1995 |
| DE | 41 06 077 C2    | 4/1995 |
| DE | 195 40 513 A1   | 5/1997 |
| DE | 296 22 899 U1   | 8/1997 |
| DE |  0 815 913 A1   | 1/1998 |
| DE | 198 03 358 C2   | 2/2000 |

* cited by examiner

*Primary Examiner*—Stephen Castellano
(74) *Attorney, Agent, or Firm*—Cohen Pontani Lieberman & Pavane LLP

(57) ABSTRACT

The invention relates to a housing which is composed of two housing halves (1*a*, 1*b*) that form a bottom (5) and a lid (6) and an intervening section (7). According to the invention, sections of the walls of the two housing halves (1*a*, 1*b*) are configured as respective peripheral rims (10, 11) which are joined to each other while overlapping, thereby increasing the wall thickness in the area of the rims (10, 11). The rims (10, 11) thus contribute to the wall thickness required to impart to the housing the necessary stability.

14 Claims, 2 Drawing Sheets

HOUSING

BACKGROUND OF THE INVENTION

The invention relates to a housing for a component, preferably a pressure-loaded housing, composed of two housing halves which form a bottom, a lid and a section situated in between.

It is known to produce housings for accommodating components from at least two housing halves. The two-part configuration permits easy installation of components in the housing. For this purpose, one housing half is often designed as a lid which closes the other housing half. For weight and cost reasons, the housing halves are of thin-wall design. Either metal or plastic can be used as the material. While metal can be worked particularly easily as a function of the wall thickness and the geometry by deep-drawing or extrusion, plastic housings are often produced by means of injection-molding.

Depending on the use of the housing, the operating parameters have to be taken into consideration when configuring the housing. Particularly in the case of pressure-loaded housings, the housing wall has to have a corresponding strength. A higher strength can be achieved in a structurally particularly simple manner by increasing the wall thickness. A disadvantage here is the increased use of material which, along with the higher weight, also results in higher material costs. Moreover, limits are set in production on increasing the wall thickness as desired. Thus, deep-drawing is no longer economical after a certain wall thickness. Housings having large wall thicknesses can then be produced only from a plurality of individual parts which are subsequently joined.

The injection-molding of plastic is likewise uneconomical after a certain wall thickness, since the cycle times increase as a consequence of the higher use of material in conjunction with the extended cooling times. In order nevertheless to be able to use injection-molding as the production process, the strength has to be increased by other structural measures. One possible configuration is to reinforce the housing wall by means of ribs. In this manner, the housing can be produced with a relatively thin housing wall. A disadvantage of this configuration is the structurally complicated construction. A construction of this type requires corresponding injection-molding tools in production which involve a great deal of cost on account of the complicated geometry.

The invention is based on the object of providing a housing which, while using simple production methods is suitable for increased pressure loads.

BRIEF DESCRIPTION OF THE INVENTION

The object is achieved by the features of claim 1. Advantageous configurations are described in the subclaims.

The housing according to the invention, the strength of which is formed by the wall thickness of the housing, is composed of two housing halves which comprise the bottom, the lid and a section lying in between. Parts of the wall of each housing half are designed as a peripheral edge, the edges of the two housing halves overlapping when joined. The overlapping arrangement of the edges brings about an increase in the wall thickness in the region of the edges. The two edges thereby contribute to forming the necessary wall thickness in order to achieve the required strength. The essential advantage of this arrangement is that the edges can have a smaller wall thickness, as a result of which the housing halves can be produced cost-effectively by production methods such as extrusion, deep-drawing or injection-molding. In order to join the housing halves, different joining methods, such as bonding, laser or ultrasonic welding, can be used.

In one advantageous refinement, the edges extend over the section lying between the bottom and lid. It is thus conceivable for the edges to overlap only over part of their axial extent.

However, the overlap of the edges over their entire axial extent has proven particularly favorable. This enables the edges to have a smaller wall thickness over their entire axial extent, which is of further benefit to the production of the housing halves.

In one advantageous development of the invention, the bottom and the lid are curved. The curved design is distinguished by particularly high strength values, so that a strength which is comparable with that of the section between the bottom and lid is already achieved at a substantially smaller wall thickness. This has in turn the consequence that, given a corresponding design, the bottom and/or the lid has/have the same wall thickness as the edge of the corresponding housing half. The wall of the housing half therefore has a constant wall thickness without sudden transitions. The production is thereby further simplified. This design has a particularly advantageous effect in injection-molding, since sudden transitions in walls require an increased outlay, for example longer cooling times. Owing to the invention, the cross section of the section between the bottom and lid can be as desired, for example can be circular, oval or rectangular.

Furthermore, it has proven favorable for the edges to be formed with a decreasing wall thickness toward the open sides of the housing halves. The mirror-inverted arrangement of the edges in the joined state ensures a constant wall thickness over the entire region of the edges. The advantage of the reduced wall thickness resides in the manufacturing, since the housing parts can thereby be designed with demolding slopes.

Depending on the joining method used, it is advantageous to arrange at least one peripheral collar in the region of the edges, the collar or collars being arranged on those sides of the edges which lie opposite one another. This results in defined bearing surfaces of the two edges, which is crucial, particularly in the case of edges which extend over the entire section between the bottom and lid and completely overlap. The welding by means of laser or ultrasound is considerably simplified in the case of plastic housings, since the welding can be limited to the region of the peripheral collar.

The arrangement of a collar in the region of an edge which faces away from the open side of the housing half is particularly advantageous. In the case of edges having a decreasing wall thickness, collars can be formed in a particularly simple manner by the fact that the collar has a boundary surface only on the side which faces the open end of the housing half.

An undercut is therefore avoided and it is possible, in spite of the collar, for the housing half to be readily removed from the mold.

BRIEF DESCRIPTION OF THE DRAWINGS

The invention will be explained in greater detail with reference to a number of exemplary embodiments. In the figures

DETAILED DESCRIPTION OF THE INVENTION

Figure 1:
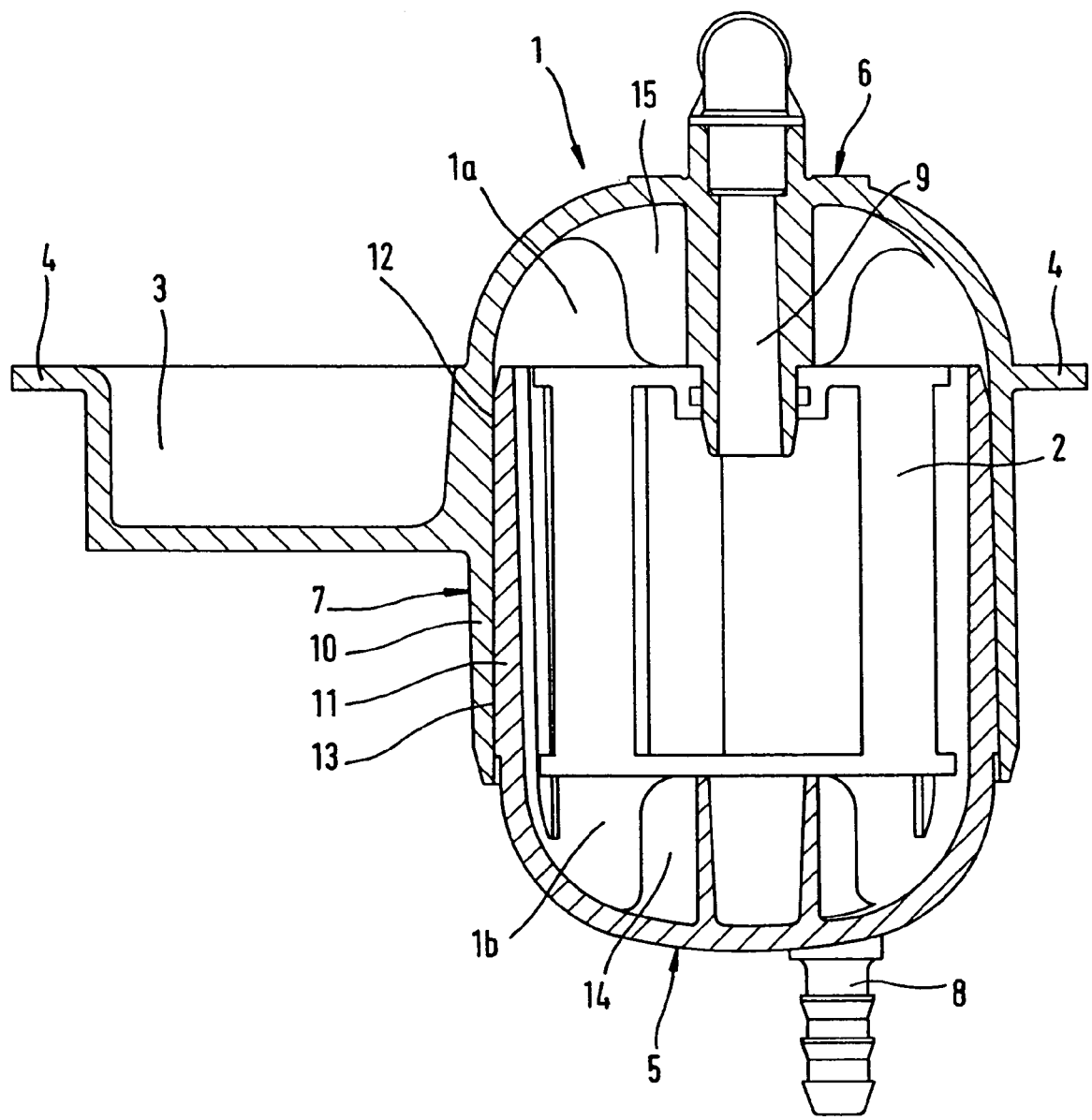
FIG. 1 shows a section through a housing according to the invention with a filter.

FIG. 1 illustrates a housing 1 made of plastic having a filter 2 arranged in it, for a motor vehicle. The housing 1 is part of a lid 3 which uses a flange 4 to close an opening into a fuel tank. The housing 1 has a bottom 5, a lid 6 and a cylindrical section 7 lying in between. The bottom 5 contains a connecting branch 8 which is connected to a fuel line (not illustrated) and via which the fuel conveyed out of the fuel tank enters into the housing 1. After passing the filter 2, the fuel leaves the housing 1 via an outlet branch 9, which is likewise connected to a fuel line (not illustrated) and via which the fuel is conveyed to the internal combustion engine. The housing 1 is formed by two housing halves 1a, 1b. The housing half 1a is composed of the lid 6 and a peripheral, cylindrical edge 10 which forms the outer part of the wall of the section 7. The edge 10 extends in the axial direction over the entire length of the section 7. The housing half 1b is composed of the bottom 5 and a likewise peripheral, cylindrical edge 11 which forms the inner part of the wall of the section 7. The edge 11 likewise extends in the axial direction over the entire length of the section 7. In the case of the housing illustrated in FIG. 1, the two edges 10, 11 overlap completely, with reference to their axial extent. The two edges 10, 11 together form the wall of the section 7 with the required strength. The two edges 10, 11 are formed with decreasing wall thickness toward the respectively open end of the housing halves 1a, 1b. The wall thickness of the edge 10 decreases in the direction of the bottom 5 beginning at the transition of the lid 6 to the edge 10. The analogous design of the edge 11 and its mirror-inverted arrangement with respect to the edge 10 mean that the section 7 has the same wall thickness in each region. The lid 6 and bottom 5 respectively adjoining the corresponding edge 10, 11 are of curved design. The dome shape of the bottom 5 and lid 6 is distinguished by a high strength with a small wall thickness. As a consequence of the strength achieved via the geometrical shape, the wall thickness of the bottom 5 and of the lid 6 is approximately identical to the wall thickness of the particular edge 10, 11. Owing to the geometrical shape of the section 7, the latter requires twice the wall thickness for an approximately identical strength as the lid 6 and the bottom 5. For the pressure-resistant connection of the housing halves 1a, 1b, the latter are joined by means of laser welding after transmission welding by the housing halves being connected in the region of the section 7 by a respective peripheral weld seam 12, 13, the weld seams 12, 13 being situated close to the transition to the bottom 5 and lid 6, respectively. The filter 2 is held and mounted in the housing 1 by means of ribs 14, 15 arranged in the bottom 5 and lid 6.

Figure 2:
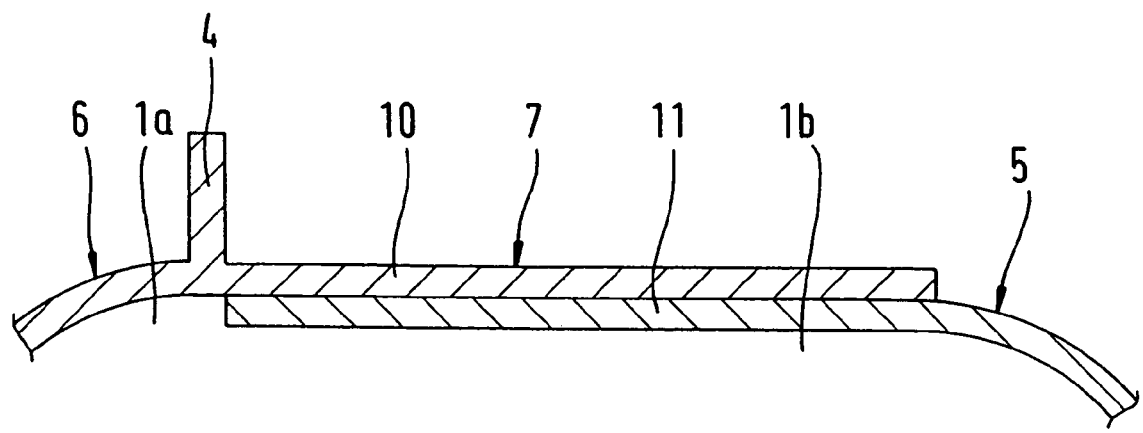
FIG. 2 shows an enlarged sectional illustration of the housing wall according to FIG. 1.
Figure 2A:
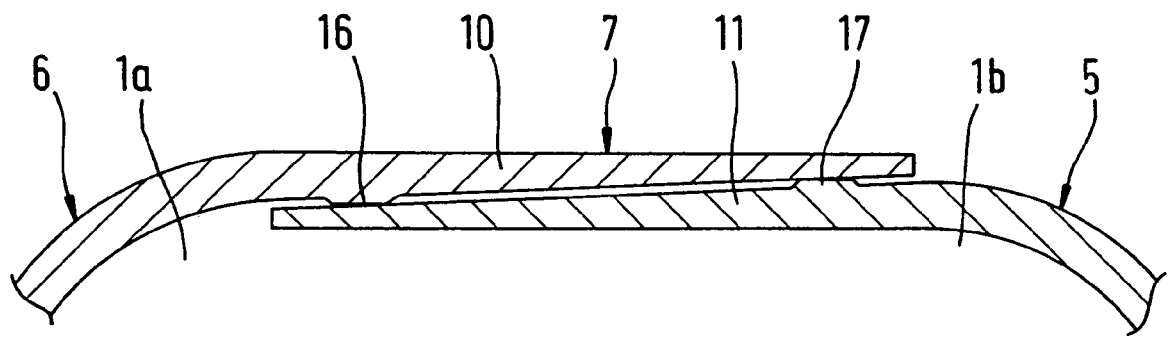
FIG. 2*a* shows a section according to FIG. 2 with a wall which differs from FIG. 2.

FIG. 2 shows the cylindrical section 7 which is formed by the edges 10, 11 of the housing halves 1a, 1b. The edges 10, 11 have a constant wall thickness and overlap completely over their axial extent. At a wall thickness of the edges 10, 11 of 2.5 mm-3 mm in each case, the housing has sufficient strength in order to withstand a permanent load of 8-10 bar. The bursting pressure is substantially higher at over 30 bar. The embodiment illustrated schematically in FIG. 2a likewise shows the section 7 which is formed by the edges 10, 11. The edges 10, 11 are formed with a wall thickness which decreases toward the particular open end of the housing halves 1a, 1b. Each edge 10, 11 has a peripheral collar 16, 17 in the region which faces away from the open end of the housing half 1a, 1b. The collars 16, 17 are arranged on those sides of the edges 10, 11 which lie opposite each other. The subsequent welding of the two housing halves 1a, 1b takes place in the region of the collars 16, 17. The collars 16, 17 have an end surface which is parallel to the axis of symmetry. However, other configurations, for example concave, convex, are also conceivable.

Figure 3:
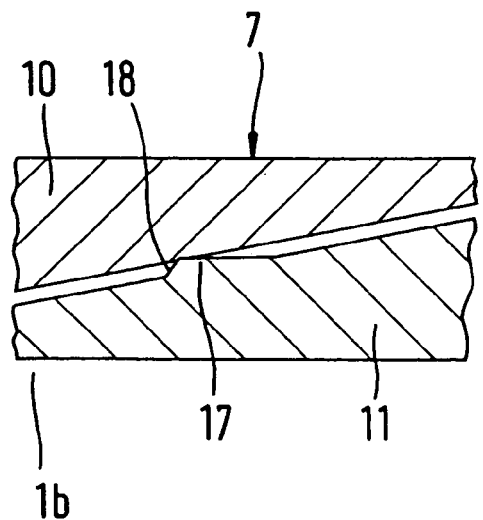
FIG. 3 shows an enlarged illustration of the collar.

FIG. 3 shows the section 7 in the region of the collar 17. The edges 10, 11 have a decreasing wall thickness. Owing to the variable wall thickness, the collar 17 has a step 18 only on the side which faces the open end of the housing half 1b. On the opposite side, the collar 17 merges with a bend into the edge 11.

The invention claimed is:

1. A fuel filter housing for use in a motor vehicle, comprising:
    two housing halves which form a bottom, a lid, and a side wall section located between the bottom and lid one of the housing halves defining an outlet and the other of the housing halves defining an input connectable to a fuel line for receiving fuel, each housing half having a wall thickness which is sufficient for a designated strength and comprising ribs configured to hold and mount a fuel filter inside the housing, the side wall section being formed by overlapping side wall portions of the housing halves,
    wherein each of the side wall portions of the housing halves comprises a peripheral edge in the region of the overlapping side wall portions,
    wherein the respective peripheral edges do not abut each other over the side wall section located between the bottom and lid, and
    wherein the wall thickness formed by the overlapped peripheral edges of the housing halves is greater than the wall thickness of either of the respective housing halves and has essentially the same wall strength as the bottom and the lid, wherein the overlapping side wall portions of the housing halves overlap over the entire length of the side wall section.

2. The fuel filter housing as claimed in claim 1, wherein the side wall section is cylindrical.

3. The fuel filter housing as claimed in claim 1, wherein the bottom and the lid are dome shaped.

4. The fuel filter housing as claimed in claim 1, wherein the bottom and lid are curved.

5. The fuel filter housing as claimed in claim 1, wherein the peripheral edges extend with a constant wall thickness into the respective bottom and lid.

6. The fuel filter housing as claimed in claim 1, wherein the peripheral edges are designed with a wall thickness which is reduced toward the open end of the respective housing half.

7. The fuel filter housing as claimed in claim 1, wherein at least one integrally formed raised peripheral collar is arranged between the respective peripheral edges.

8. The fuel filter housing as claimed in claim 1, wherein an integrally formed raised peripheral collar is arranged on each of the respective peripheral edges and the respective peripheral collars are disposed between the respective peripheral edges.

9. The fuel filter housing as claimed in claim 8, wherein each of the peripheral collars has step only on a side which faces an open end of the respective housing half.

10. The fuel filter housing as claimed in claim 7, wherein the housing halves are joined by means of welding, in particular laser welding or ultrasonic welding in the region of the peripheral collar.

11. The fuel filter housing as claimed in claim 1, wherein the housing halves are joined by means of bonding.

12. The fuel filter housing as claimed in claim 1, wherein one of the housing halves comprises a part of a lid for closing an opening in a fuel tank.

13. The fuel filter housing as claimed in claim 1, wherein the wall strength of the bottom, the lid and the overlapping peripheral edges is sufficient to withstand a maximum permanent load in the range of 8-10 bar.

14. The fuel filter housing as claimed in claim 1, wherein the ribs are disposed on both the bottom and the lid.

* * * * *